US 12,406,348 B2

United States Patent
Urban et al.

(10) Patent No.: US 12,406,348 B2
(45) Date of Patent: Sep. 2, 2025

(54) NEUROMORPHIC FOREIGN OBJECT DETECTION

(71) Applicant: RTX Corporation, Farmington, CT (US)

(72) Inventors: Justin R Urban, Tolland, CT (US); Kishore K. Reddy, Farmington, CT (US); Kin Gwn Lore, Belmont, MA (US); Ganesh Sundaramoorthi, Duluth, GA (US)

(73) Assignee: RTX CORPORATION, Farmington, CT (US)

( * ) Notice: Subject to any disclaimer, the term of this patent is extended or adjusted under 35 U.S.C. 154(b) by 151 days.

(21) Appl. No.: 18/336,605

(22) Filed: Jun. 16, 2023

(65) Prior Publication Data

US 2024/0420302 A1 Dec. 19, 2024

(51) Int. Cl.

| G06T 7/00 | (2017.01) |
|---|---|
| B64D 45/00 | (2006.01) |
| G06N 3/0455 | (2023.01) |
| H04N 7/18 | (2006.01) |
| H04N 23/54 | (2023.01) |
| H04N 25/47 | (2023.01) |

(52) U.S. Cl.
CPC ............ *G06T 7/0004* (2013.01); *B64D 45/00* (2013.01); *G06N 3/0455* (2023.01); *H04N 7/183* (2013.01); *H04N 23/54* (2023.01); *H04N 25/47* (2023.01); *B64D 2045/009* (2013.01); *G06T 2207/20081* (2013.01); *G06T 2207/20084* (2013.01); *G06T 2207/30108* (2013.01)

(58) Field of Classification Search
CPC ......... G06T 7/0004; G06T 2207/20081; G06T 2207/20084; G06T 2207/30108; B64D 45/00; B64D 2045/009; G06N 3/0455; H04N 7/183; H04N 23/54; H04N 25/47; G06V 10/82; G06V 20/52
See application file for complete search history.

(56) References Cited

U.S. PATENT DOCUMENTS

| 7,061,401 B2 * | 6/2006 | Voos ..................... G08G 5/55 348/148 |
|---|---|---|
| 10,650,646 B2 | 5/2020 | Allen et al. |
| 11,978,181 B1 * | 5/2024 | Pieper ................... G06T 11/001 |

(Continued)

OTHER PUBLICATIONS

Extended European Search Report for EP Application No. 24182613.0, dated Oct. 29, 2024, pp. 1-10.

(Continued)

*Primary Examiner* — Fernando Alcon
(74) *Attorney, Agent, or Firm* — CANTOR COLBURN LLP (57) ABSTRACT

A neuromorphic foreign object debris (FOD) detection system includes a FOD processing system and a neuromorphic sensor. The FOD processing system includes a FOD controller including a trained artificial intelligence machine learning (AIML) model representing an area of interest. The neuromorphic sensor has a field of view (FOV) containing the area of interest and is configured to output pixel data in response to FOD appearing in the FOV. The FOD controller detects the FOD is present in the area of interest in response to receiving the pixel data, and generates an alert signal indicating the presence of the FOD.

17 Claims, 8 Drawing Sheets

(56) References Cited

U.S. PATENT DOCUMENTS

| | | | |
|---|---|---|---|
| 12,188,878 B2* | 1/2025 | Nicholas | G01V 8/20 |
| 2018/0084988 A1* | 3/2018 | Chakravorty | A61B 5/7275 |
| 2018/0211303 A1* | 7/2018 | Chatwin | G06N 20/00 |
| 2018/0293736 A1* | 10/2018 | Rahimi | G06V 10/454 |
| 2019/0087635 A1* | 3/2019 | Klaus | H04N 13/239 |
| 2021/0325315 A1* | 10/2021 | Ray | G01N 21/94 |
| 2022/0138466 A1* | 5/2022 | Bisulco | G06V 10/82 |
| | | | 348/142 |
| 2022/0291139 A1* | 9/2022 | Nicholas | G01S 17/58 |
| 2022/0301314 A1 | 9/2022 | Vindler et al. | |
| 2022/0397919 A1* | 12/2022 | Hagen | G05D 1/106 |
| 2023/0206588 A1* | 6/2023 | Colabrese | G06N 3/08 |
| | | | 382/190 |
| 2024/0054773 A1* | 2/2024 | Mansata | G06V 10/26 |
| 2024/0212205 A1* | 6/2024 | Gabor | G06V 10/82 |
| 2024/0292074 A1* | 8/2024 | Shishkin | H04N 23/13 |

OTHER PUBLICATIONS

Gallego et al., "Event-Based Vision: A Survey", IEEE Transactions on Pattern Analysis and Machine Intelligence, vol. 44, No. 1, Jan. 2022, pp. 154-180.

Noroozi et al., "Towards optimal foreign object debris detection in an airport environment", Expert Systems with Applications, 2023, pp. 1-16.

Xu et al., "Foreign object debris material recognition based on convolutional neural networks", EURASIP Journal on Image and Video Processing, 2018, pp. 1-10.

* cited by examiner

NEUROMORPHIC FOREIGN OBJECT DETECTION

BACKGROUND

Exemplary embodiments of the present disclosure pertain to aircraft engine production and maintenance, and more particularly, to foreign object debris detection in the presence of aircraft engines.

FOD (Foreign Object Debris) is material that is present that has the potential to significantly damage or destroy an aircraft engine that is at test in a test cell or in operation on an aircraft in ground operations. FOD material can be brought in by wind, foot traffic, vehicle traffic, fall off of machines, equipment, and/or be dropped by personnel. Current solutions to prevent FOD damage typically involves manual inspection of test cell and shop floors and aircraft taxiways and runways. Although the ingestion of FOD material into the engine is uncommon, the consequences of ingestion are substantial and include engine damage and/or complete engine failure.

BRIEF DESCRIPTION

According to a non-limiting embodiment, a neuromorphic foreign object debris (FOD) detection system includes a FOD processing system and a neuromorphic sensor in signal communication with the FOD processing system. The FOD processing system includes a FOD controller including a trained artificial intelligence machine learning (AIML) model representing an area of interest. The neuromorphic sensor has a field of view (FOV) containing the area of interest and is configured to output pixel data in response to FOD appearing in the FOV. The FOD controller detects the FOD is present in the area of interest in response to receiving the pixel data, and generates an alert signal indicating the presence of the FOD.

In addition to one or more of the features described above, or as an alternative to any of the foregoing embodiments, the AIML model is implemented as a deep convolutional neural network (DCNN) model.

In addition to one or more of the features described above, or as an alternative to any of the foregoing embodiments, the AIML model is implemented as a deep convolutional auto encoder (CAE) model.

In addition to one or more of the features described above, or as an alternative to any of the foregoing embodiments, the neuromorphic sensor includes an event camera.

In addition to one or more of the features described above, or as an alternative to any of the foregoing embodiments, the area of interest includes an aircraft engine.

In addition to one or more of the features described above, or as an alternative to any of the foregoing embodiments, the neuromorphic sensor is located remotely from the aircraft engine and the FOV contains the aircraft engine.

In addition to one or more of the features described above, or as an alternative to any of the foregoing embodiments, the neuromorphic sensor is coupled to an aircraft engine and the FOV contains the aircraft engine.

In addition to one or more of the features described above, or as an alternative to any of the foregoing embodiments, the neuromorphic sensor is disposed inside the aircraft engine.

According to another non-limiting embodiment, a method of performing neuromorphic foreign object debris (FOD) detection comprises generating training data and training an artificial intelligence machine learning (AIML) model using the training data depicting an area of interest. The method further comprises monitoring the area of interest using a neuromorphic sensor, and outputting pixel data from the neuromorphic sensor in response to FOD appearing in the area of interest. The method further comprises generating an alert indicating a presence of FOD in the area of interest in response based on the pixel data.

In addition to one or more of the features described above, or as an alternative to any of the foregoing embodiments, the AIML model is implemented as a deep convolutional neural network (DCNN) model.

In addition to one or more of the features described above, or as an alternative to any of the foregoing embodiments, the AIML model is implemented as a deep convolutional auto encoder (CAE) model.

In addition to one or more of the features described above, or as an alternative to any of the foregoing embodiments, the area of interest includes an aircraft engine.

In addition to one or more of the features described above, or as an alternative to any of the foregoing embodiments, the neuromorphic sensor is located remotely from the aircraft engine and the FOV contains the aircraft engine.

In addition to one or more of the features described above, or as an alternative to any of the foregoing embodiments, the neuromorphic sensor is coupled to an aircraft engine and the FOV contains the aircraft engine.

In addition to one or more of the features described above, or as an alternative to any of the foregoing embodiments, the neuromorphic sensor is disposed inside the aircraft engine.

In addition to one or more of the features described above, or as an alternative to any of the foregoing embodiments, the AIML model is implemented as a deep convolutional neural network (DCNN) model.

In addition to one or more of the features described above, or as an alternative to any of the foregoing embodiments, the AIML model is implemented as a deep convolutional auto encoder (CAE) model.

In addition to one or more of the features described above, or as an alternative to any of the foregoing embodiments, the area of interest includes an aircraft engine.

In addition to one or more of the features described above, or as an alternative to any of the foregoing embodiments, the neuromorphic sensor is located remotely from the aircraft engine and the FOV contains the aircraft engine.

In addition to one or more of the features described above, or as an alternative to any of the foregoing embodiments, the neuromorphic sensor is coupled to an aircraft engine and the FOV contains the aircraft engine.

In addition to one or more of the features described above, or as an alternative to any of the foregoing embodiments, the neuromorphic sensor is disposed inside the aircraft engine.

BRIEF DESCRIPTION OF THE DRAWINGS

The following descriptions should not be considered limiting in any way. With reference to the accompanying drawings, like elements are numbered alike:

FIG. 2B illustrates an unsupervised training process to train an artificial intelligence machine learning (AIML)

algorithm/model employed the neuromorphic FOD detection system according to non-limiting embodiment of the present disclosure;

DETAILED DESCRIPTION

A detailed description of one or more embodiments of the disclosed apparatus and method are presented herein by way of exemplification and not limitation with reference to the Figures.

Traditional cameras (sometimes referred as "RGB pixel cameras" or "shutter cameras") capture entire images in the camera's field of view (FOV) each time the shutter is opened. As a result, a large amount of pixel data is captured and in turn requires a large amount of memory and processing power to process the captured pixel data. Moreover, high-speed imaging necessary for object detection, for example, has proven to be impractical using traditional cameras due to the large amounts of memory space required for storage of high speed videos, and the intensive time-consuming task to view them frame by frame.

In contrast to traditional cameras (e.g., RGB pixel cameras or shutter cameras), a neuromorphic sensor (sometimes referred to as an "event camera") is an imaging sensor that responds to local changes in brightness instead of capturing the full image in the FOV using a camera shutter. Each pixel in a pixel array of the neuromorphic sensor operates independently and asynchronously, each reporting changes in brightness as they occur (referred to herein as an "event"). For example, each pixel stores a reference brightness level (e.g., a preset threshold), and continuously compares the reference brightness level to a current level of brightness. If a difference in brightness exceeds the reference brightness level, the pixel resets the reference brightness level and generates an indication of the event, which can comprise a data packet of information or message containing the pixel's address (e.g., x, y, or other spatial coordinates in the pixel array), a timestamp indicating a time of the event (i.e., a time that the event occurred), and a value representing a change in brightness detected by the pixel (e.g., a polarity (increase or decrease) of a brightness change, or a measurement of a current level of illumination). Accordingly, the neuromorphic sensor can provide a focal plane array (FPA) sensitivity, dynamic range, and an effective frame rate to enable Fourier Transform spectroscopy for scenes in motion.

Various embodiments of the present disclosure provides a neuromorphic foreign object debris (FOD) detection system, which implements one or more neuromorphic sensors configured to detect FOD in an area of interest such as, for example, near an aircraft engine. The FOD system can employ an artificial intelligence machine learning (AIML) algorithm or model such as a deep convolutional neural network (DCNN) model and/or a deep convolutional auto encoder (CAE) model, which is trained using image and/or video data depicting a FOV or scene of an area of interest in which to detect FOD. As descried herein, the neuromorphic sensor outputs only the pixel data associated with the pixels containing the changes in the image. Accordingly, the imaging system is able to process a lower amount of pixel data and generate an alert indicating a change in the image scene such as, for example, when FOD is located in the presence of an aircraft engine. In one or more non-limiting embodiments, the neuromorphic FOD detection system is capable of detecting the presence of FOD and automatically generating an alert of the presence of FOD. In this manner, a service technician can be dispatched to remove the FOD and prevent it from being ingested into the engine.

Figure 1:
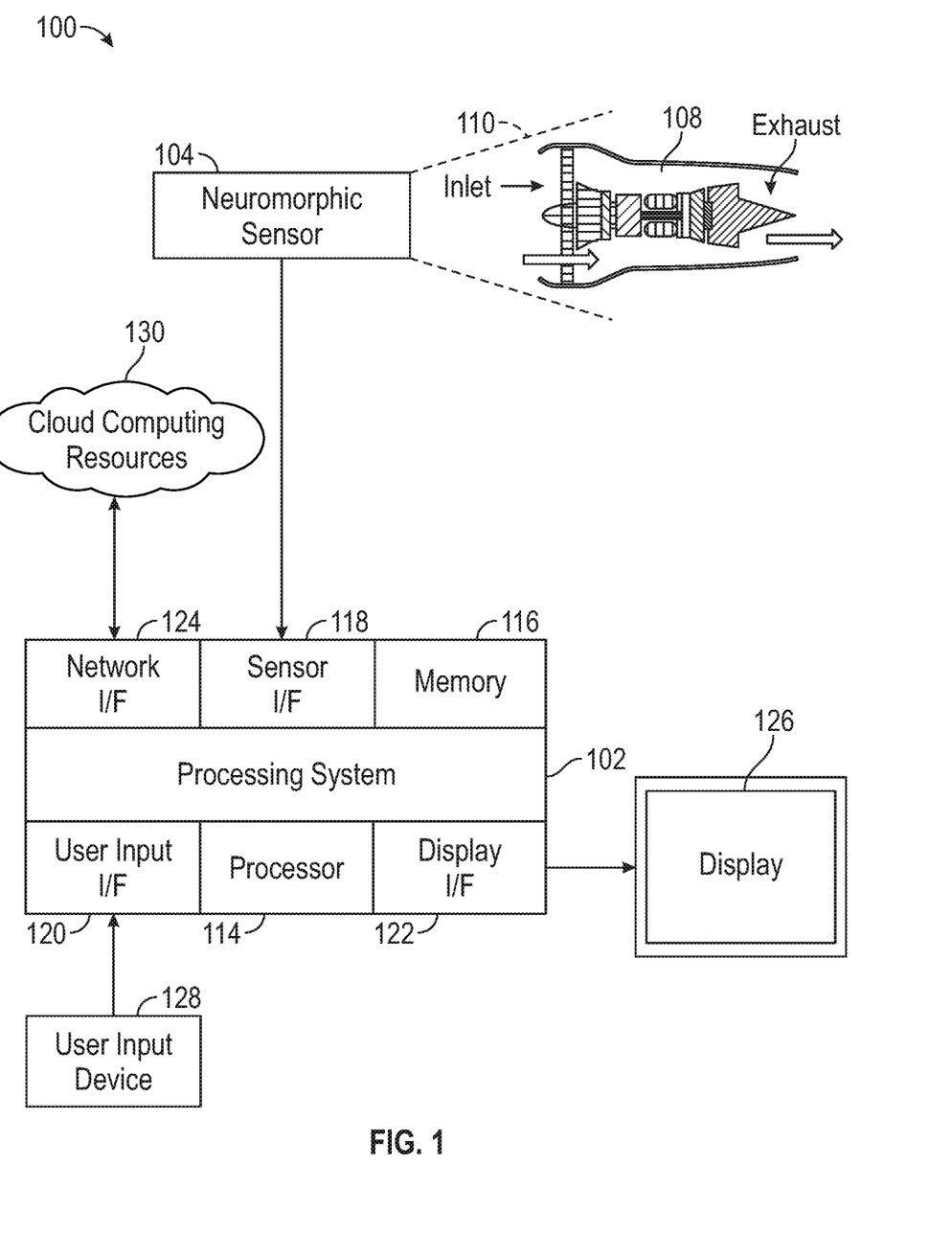
FIG. 1 depicts a neuromorphic FOD detection system according to a non-limiting embodiment of the present disclosure.

With reference now to the drawings, FIG. 1 depicts a neuromorphic foreign object debris (FOD) detection system 100 that includes a processing system 102 and one or more neuromorphic sensors 104. The neuromorphic sensors 104 can include one or more "event cameras" 104, which can analyze one or more structures 108 and objects within a FOV 110. The structure 108 described herein is an aircraft engine such as gas turbine engine 108, for example, but it should appreciated that the neuromorphic sensors 104 descried herein can analyze other types of structures 108 without departing from the scope of the invention.

The processing system 102 includes at least one processor 114, memory 116, and a sensor interface 118. The processing system 102 can also include a user input interface 120, a display interface 122, a network interface 124, and other features known in the art. The neuromorphic sensors 104 are in signal communication with the sensor interface 118 via wired and/or wireless communication. In this manner, pixel data output from the neuromorphic sensors 104 can be delivered to the processing system 102 for processing.

The processor 114 can be any type of central processing unit (CPU), or graphics processing unit (GPU) including a microprocessor, a digital signal processor (DSP), a microcontroller, an application specific integrated circuit (ASIC), a field programmable gate array (FPGA), or the like. Also, in embodiments, the memory 116 may include random access memory (RAM), read only memory (ROM), or other electronic, optical, magnetic, or any other computer readable medium onto which is stored data and algorithms as executable instructions in a non-transitory form.

The processor 114 and/or display interface 122 can include one or more graphics processing units (GPUs) which may support vector processing using a single instruction multiple data path (SIMD) architecture to process multiple layers of data substantially in parallel for output on display 126. The user input interface 120 can acquire user input from one or more user input devices 128, such as keys, buttons, scroll wheels, touchpad, mouse input, and the like. In some embodiments the user input device 128 is integrated with the display 126, such as a touch screen. The network interface 124 can provide wireless and/or wired communication with one or more remote processing and/or data resources, such as cloud computing resources 130. The cloud computing resources 130 can perform portions of the processing described herein and may support model training.

Figure 2A:
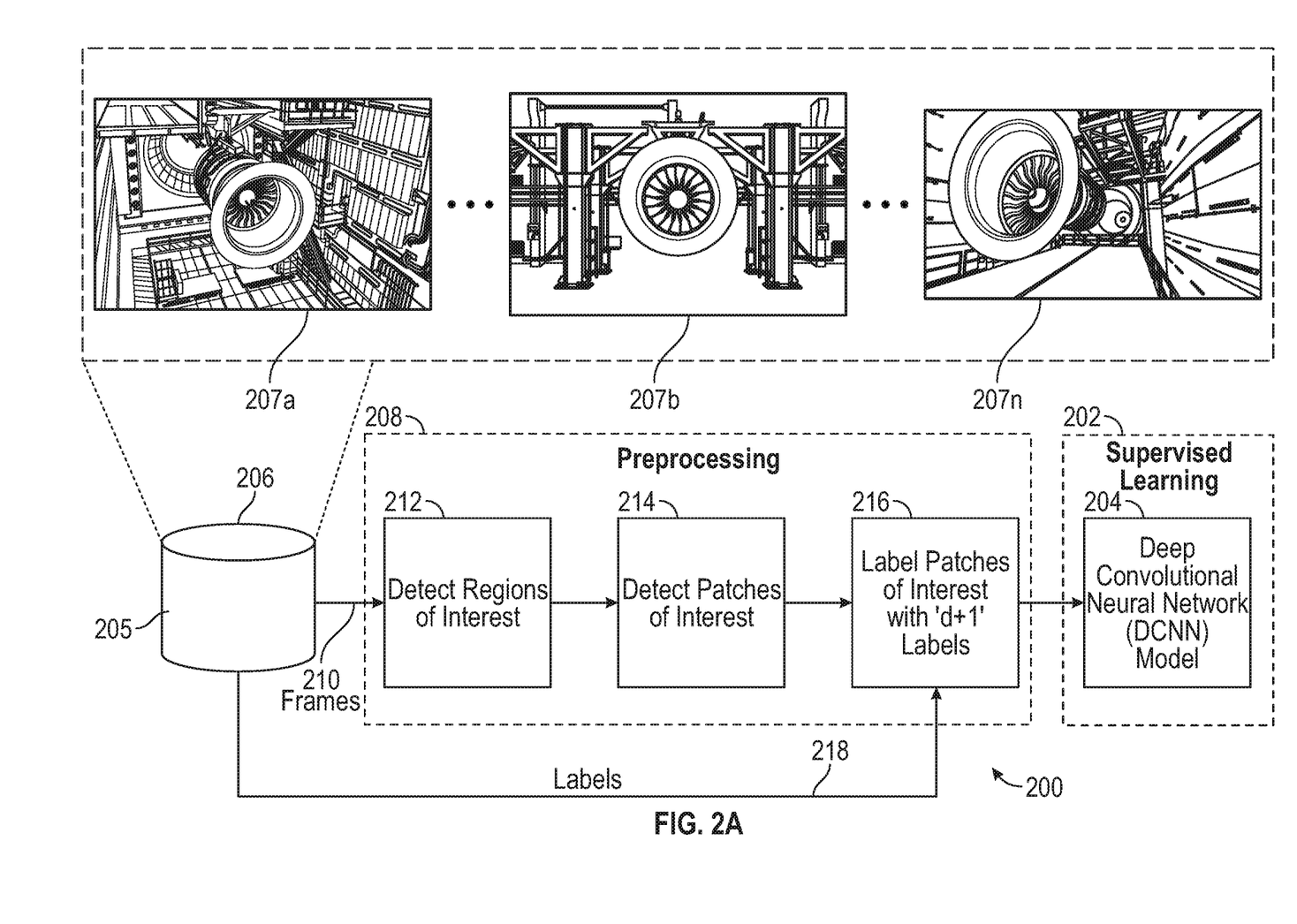
FIG. 2A illustrates a supervised training process to train an artificial intelligence machine learning (AIML) algorithm/model employed the neuromorphic FOD detection system according to a non-limiting embodiment of the present disclosure.

FIG. 2A illustrates a training process 200 using supervised learning 202 to train an artificial intelligence machine learning (AIML) algorithm or model 204 executed by the neuromorphic FOD detection system 100 according to a non-limiting embodiment of the present disclosure. In the example of FIG. 2A, a data source 206 provides training data 205 to develop the AIML algorithm or model 204, which when developed represent an area of interest in which to detect FOD. The training data 205 depicts an area of interest in which to FOD is to be detected. In the example illustrated in FIG. 2A, the training data 205 is used to develop the AIML algorithm or model 204 after preprocessing 208 is performed. It should be appreciated, however, that the preprocessing 208 can be omitted and the data source 206 can provide the data 205 directly to the AIML algorithm or model 204 without departing from the scope of the invention.

The training data 205 in data source 206 can originate from data captured by one or more of the neuromorphic sensors 104 shown in FIG. 1 during a training phase. The training process 200 may be performed as part of an off-line process using a separate processing system other than the processing system 102 of FIG. 1. Alternatively, the processing system 102 may be configured in a training phase to implement the training process 200 of FIG. 2A.

In the example of FIG. 2A, the area of interest depicted by the training data 205 includes video/image data (e.g., images 207a, 207b, 207n) depicting an aircraft gas turbine engine 108 installed on a testing rig captured according to different views and orientations. It should be appreciated that images of other areas of interest (e.g. other than an aircraft engine) can be used as training data to train the neuromorphic FOD detection system to detect foreign objects in different environments. For example, one or more neuromorphic sensors 104 can be coupled to the aircraft itself (e.g., to a rear portion of the aircraft or inside the engine) and orientated with a FOV 110 that includes the aircraft engine 108. The neuromorphic FOD detection system 100 can then trained to identify different views of the taxiway or runway to detect FOD that may come in close proximity to the aircraft engine.

For purposes of training, images 207a, 207b, 207n of a gas turbine engine 108 installed on a testing rig appearing in different views are labeled as such are used to train the AIML algorithm or model 204. Video frame data 210 from training data 205 can be provided to a region-of-interest detector 212 that may perform edge detection or other types of region detection known in the art as part of preprocessing 208. A patch detector 214 can detect patches (i.e., areas) of interest based on the regions of interest identified by the region-of-interest detector 212 as part of preprocessing 208. For example, a threshold can be applied on a percentage of pixels with edges in a given patch. A labeler 216 extracts label data 218 from the training data 205 and applies labels to video data 210 from selected patches of interest as detected by the patch detector 214 as part of preprocessing 208, where labeling can be on a patch or pixel basis.

For each selected patch, the labeler 216 applies the label data 218 to the frame data 210 on multiple channels. If the training data 205 includes two different labels, then the labeler 216 can apply at least one new label normal/undamaged edges). The labeled data from the labeler 216 is used for supervised learning 202 to train the AIML algorithm or model 204 using a convolutional neural network (CNN) which may also be referred to as a deep CNN or DCNN. Supervised learning 202 can compare classification results of the AIML algorithm or model 204 to a ground truth and can continue running iterations of the AIML algorithm or model 204 until a desired level of classification confidence is achieved. In this manner, the neuromorphic FOD detection system 100 can be trained to learn the "nominal" surroundings or environment of the engine 108, i.e., when no FOD is present near the engine 108 and detect when the surroundings or environment change once FOD becomes present.

Figure 2B:
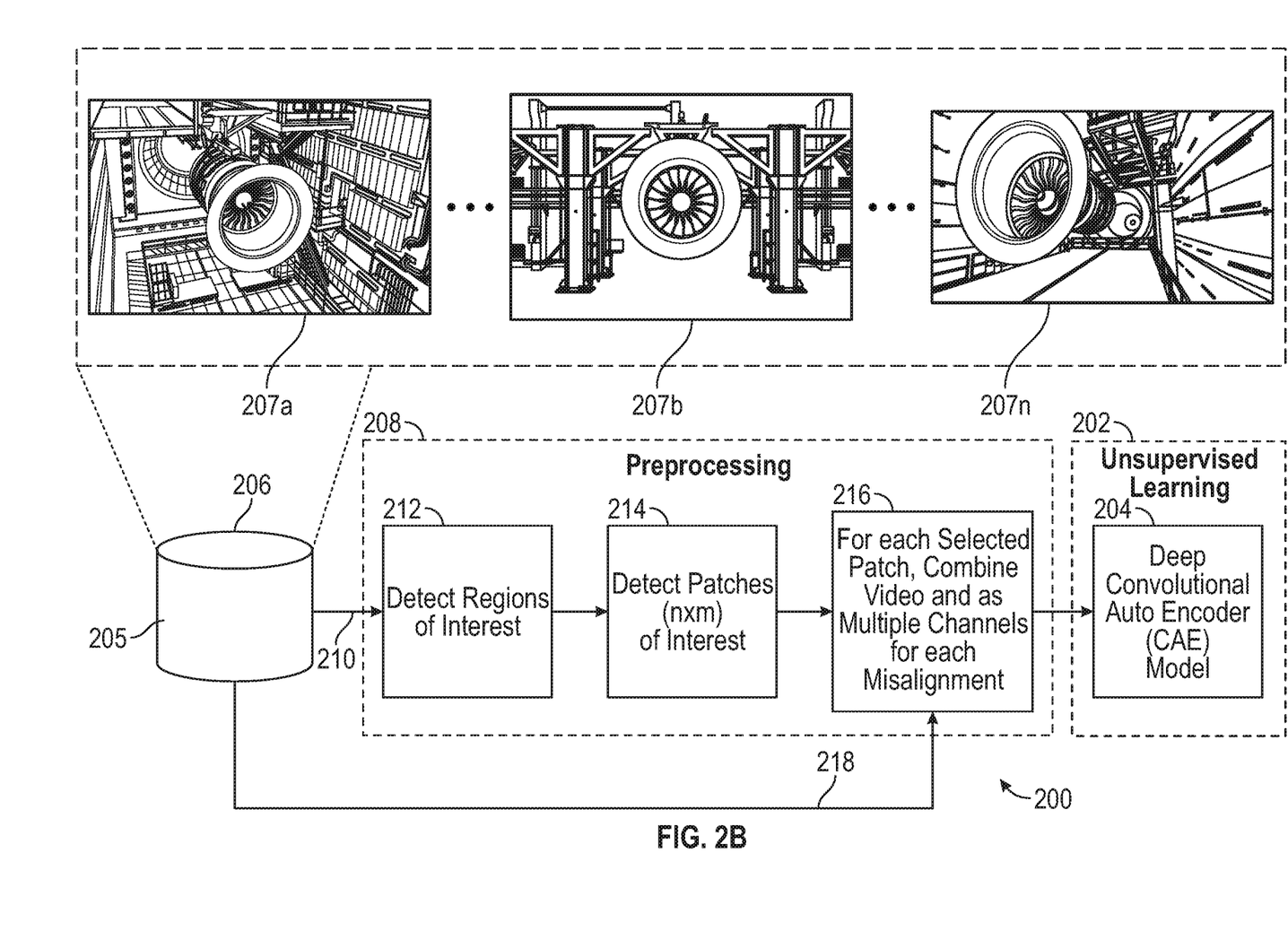

According to another non-limiting embodiment, the training process 200 can use unsupervised learning to train an artificial intelligence machine learning (AIML) algorithm or model executed by the neuromorphic FOD detection system 100. Accordingly, the neuromorphic FOD detection system 100 can learn from normal observations and detect anomalous signatures as FOD. FIG. 2B, for example, illustrates a training process 200 using unsupervised learning 202 to train an artificial intelligence machine learning (AIML) model 204 according to an embodiment. In the example of FIG. 2B, a data source 206 provides training data 205 to develop the artificial intelligence machine learning (AIML) model 204 after preprocessing 208 is performed. It should be appreciated, however, that the preprocessing 208 can be omitted and the data source 206 can provide the data 205 directly to the auto-encoder 204 without departing from the scope of the invention.

The training data 205 in data source 206 can originate from data captured by the neuromorphic foreign object debris (FOD) detection system 100 of FIG. 1 during a training phase. The training process 200 can be performed as part of an off-line process using a separate processing system other than the processing system 102 of FIG. 1. Alternatively, the processing system 102 can be configured in a training phase to implement the training process 200 of FIG. 2B.

In the example of FIG. 2B, the training data 205 includes video and/or image data 207a, 207b, 207n, from one or more sensors, e.g., sensor 104 of FIG. 1. Given multi-modal sensor data with no prior knowledge of the system, it is possible to register the data streams. For illustration, training process 200 is described with respect to an image-video registration example. By creating an over-constrained deep auto-encoder (DAC) definition, the DAC can be driven to capture mutual information in both the image and/or video data by reducing the randomness of a DAC bottleneck layer (i.e., a reduction layer) well beyond the rank at which optimal reconstruction occurs. Minimizing the reconstruction error with respect to relative shifts of the image and/or video data reflects that the current alignment of the sensor data has the greatest correlation possible (i.e., smallest misalignment). This method can be applied for both spatial and temporal registration.

A deep neural network auto-encoder (DNN-AE) takes an input $x \in R^d$ and first maps it to the latent representation $h \in R^{d'}$ using a deterministic function of the type $h=f\theta=\sigma(Wx+b)$ with $\theta=\{W, b\}$ where W is the weight and b is the bias. This "code" is then used to reconstruct the input by a reverse mapping of $y=f\theta'(h)=\sigma(W'h+b')$ with $\theta'=\{W',b'\}$. The two parameter sets are usually constrained to be of the form $W'=W^T$, using the same weights for encoding the input and decoding the latent representation. Each training pattern $xi$ is then mapped onto its code $hi$ and its reconstruction $yi$. The parameters are optimized, minimizing an appropriate cost function over the training set $Dn=\{(x0, t0), \ldots (xn, tn)\}$.

The first step includes using a probabilistic Restricted Boltzmann Machine (RBM) approach, trying to reconstruct noisy inputs. The training process 200 can involve the reconstruction of a clean sensor input from a partially destroyed/missing sensor. The sensor input (x) becomes corrupted sensor input (x) by adding a variable amount (v) of noise distributed according to the characteristics of the input data. An RBM network is trained initially with the same number of layers as envisioned in the final DNN-AE in model 204. The parameter (v) represents the percentage of permissible corruption in the network. The model 204 is trained to de-noise the inputs by first finding the latent representation $h=f\theta(x)=\sigma(Wx+b)$ from which to reconstruct the original input $y=f\theta'(h)=\sigma(W'h+b')$.

As part of preprocessing 208, frame data 210 from training data 205 can be provided to a region-of-interest detector 212 that may perform edge detection or other types of region detection known in the art. A patch detector 214 can detect patches (i.e., areas) of interest based on the regions of interest identified by the region-of-interest detector 212 as part of preprocessing 208. Data fuser 216 can merge image data 218 from the training data 205 with image and/or video data 210 from selected patches of interest as detected by the patch detector 214 as part of preprocessing 208. The frame data 210 and image data 218 fused as multiple channels for each misalignment are provided for unsupervised learning 202 of model 204. Although depicted as a deep convolutional auto-encoder (CAE), the model 204 can use a CAE or a DNN-AE, and more generally, a deep auto-encoder.

Although not illustrated, the training process 200 can implement an autoencoder trained according to semi-supervised learning, which involves using only a few known rare FOD cases and other unlabeled FODs. The semi-supervised learning utilizes a machine learning (ML) model that can be trained according to the following operations: (1) If a label exists, directly optimize the ML model by the supervised loss (e.g., "where is the FOD? Is the predicted FOD type correct?", etc.); and (2) If label does not exist, optimize the ML model by reconstruction error. For example, the auto-encoder can be trained to learn the nominal observations and reject outliers and/or anomalies, which are likely FODs of interest.

Figure 3A:
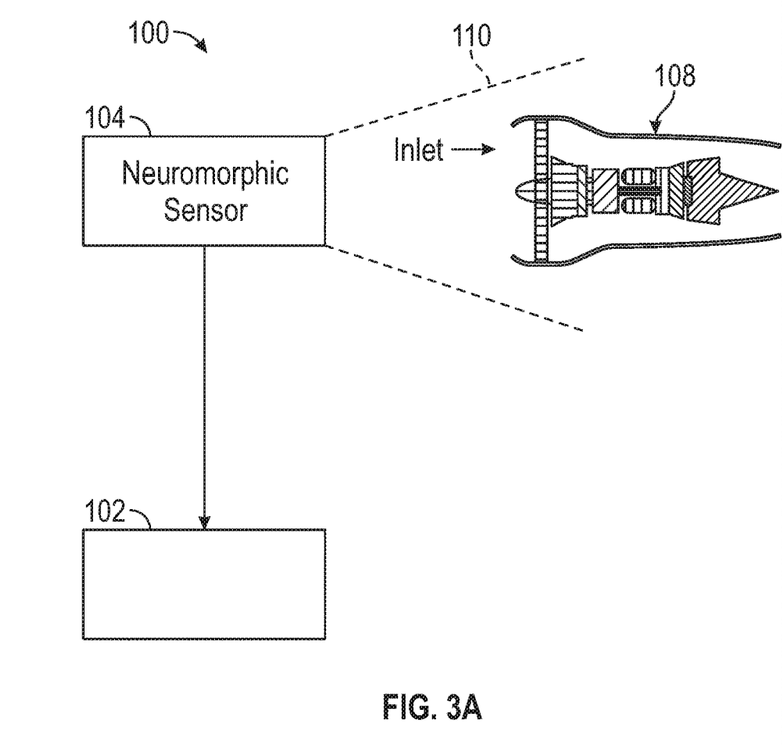
FIG. 3A depicts a neuromorphic sensor capturing an image according to a non-limiting embodiment of the present disclosure.
Figure 3B:
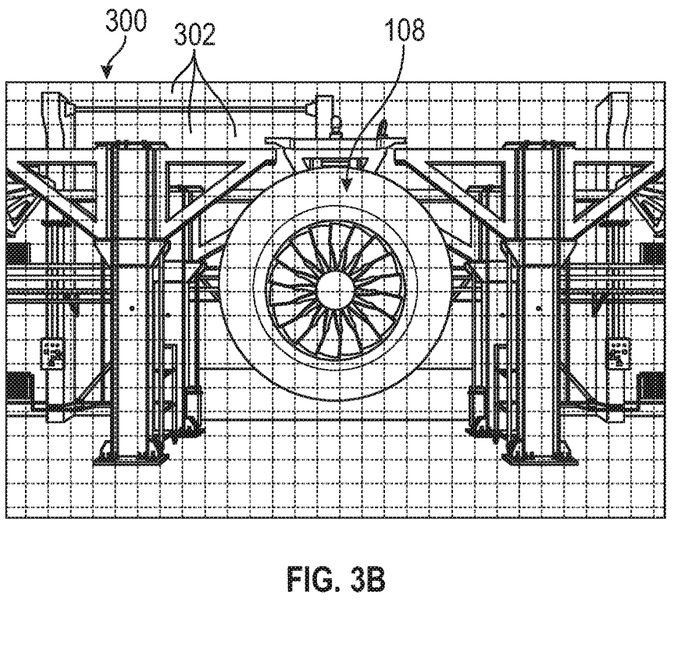
FIG. 3B depicts a field of view (FOV) of the neuromorphic sensor shown in FIG. 3A according to a non-limiting embodiment of the present disclosure.

Turning now to FIG. 3A, a neuromorphic sensor 104 is illustrated capturing an image of a gas turbine engine 108 installed on a testing rig according to a non-limiting embodiment of the present disclosure. In this example, the neuromorphic sensor 104 captures the gas turbine engine 108 in the FOV 110 while existing in a nominal environment, i.e., when no FOD 304 is present near the engine 108. FIG. 3B depicts FOV 110 of neuromorphic sensor 104 that includes the engine 108. The image generated by the neuromorphic sensor 104 includes a pixel array 300 defined by a plurality of individual pixels 302.

Figure 4A:
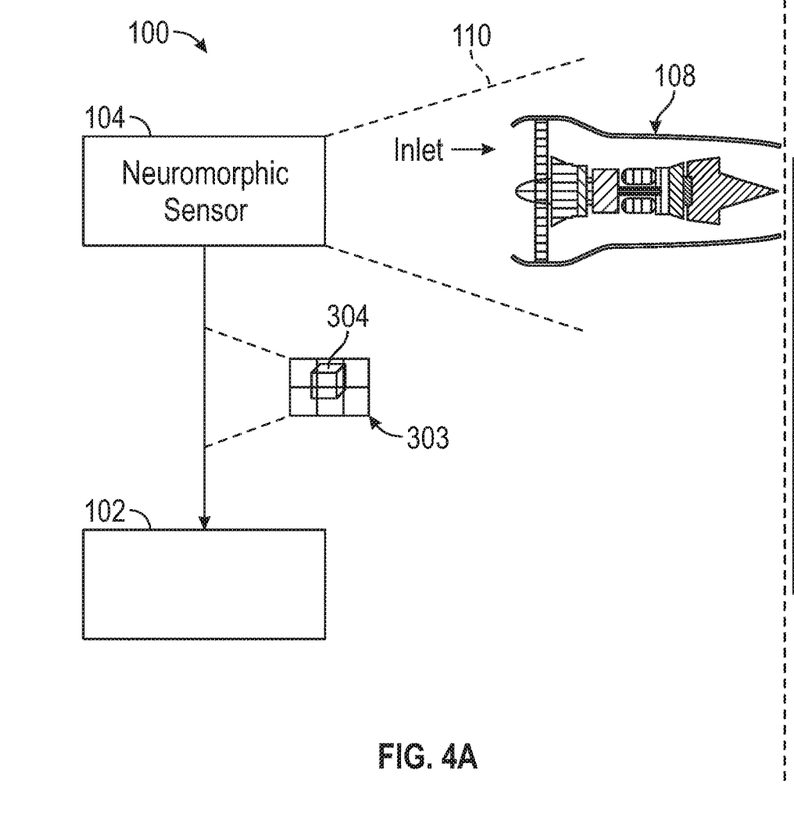
FIG. 4A depicts the neuromorphic sensor of FIG. 3A detecting FOD in the image according to another non-limiting embodiment of the present disclosure.
Figure 4B:
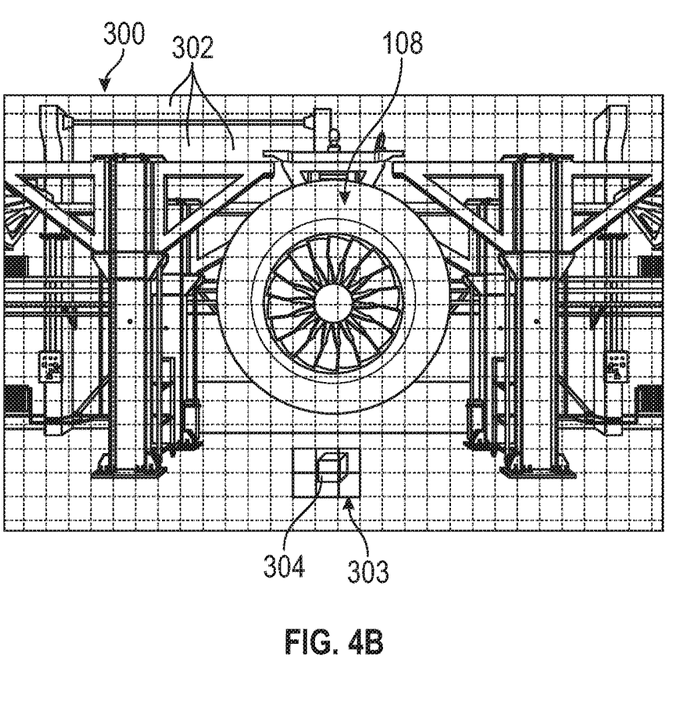
FIG. 4B depicts the FOV of FIG. 3B including FOD according to another non-limiting embodiment of the present disclosure.

In FIGS. 4A and 4B, the neuromorphic sensor 104 is depicted detecting FOD 304 in the FOV 110 and in the presence of the engine 108. The introduction of the FOD 304 changes the brightness of one or more localized pixels 303 containing the FOD 304 (as indicated by highlighted pixels 303) without changing the brightness of pixels excluding the FOD 304. Accordingly, the neuromorphic sensor 104 outputs pixel data indicating the affected localized pixels 303 and the FOD 304 without outputting pixel data corresponding to the remaining pixels 302, i.e., the pixels 302 that exclude the FOD 304. Accordingly, the processing system 102 can detect FOD 304 is present in the surrounding environment of the engine 108 which is not normally present in the nominal environment of the engine 108. In at least one non-limiting embodiment, the processing system 102 can automatically generate an alert (e.g., an audio alert, visual alert, haptic alert, etc.) that alerts a technician of the FOD 304 in response to detecting the FOD 304. In this manner, the FOD 304 can be removed from the surrounding environment so that it is not ingested into the engine 108.

Figure 5A:
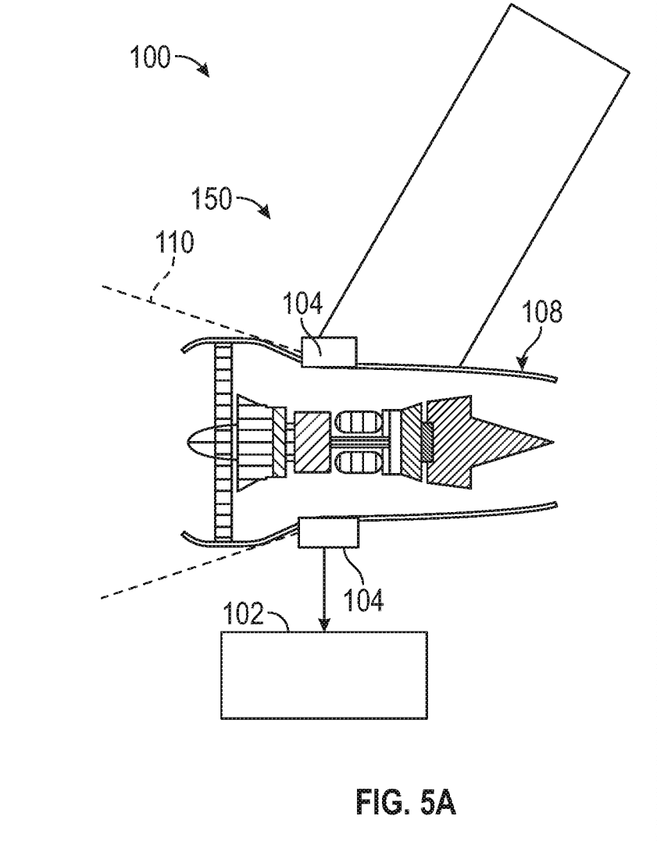
FIG. 5A depicts a neuromorphic sensor capturing an image according to another non-limiting embodiment of the present disclosure.
Figure 5B:
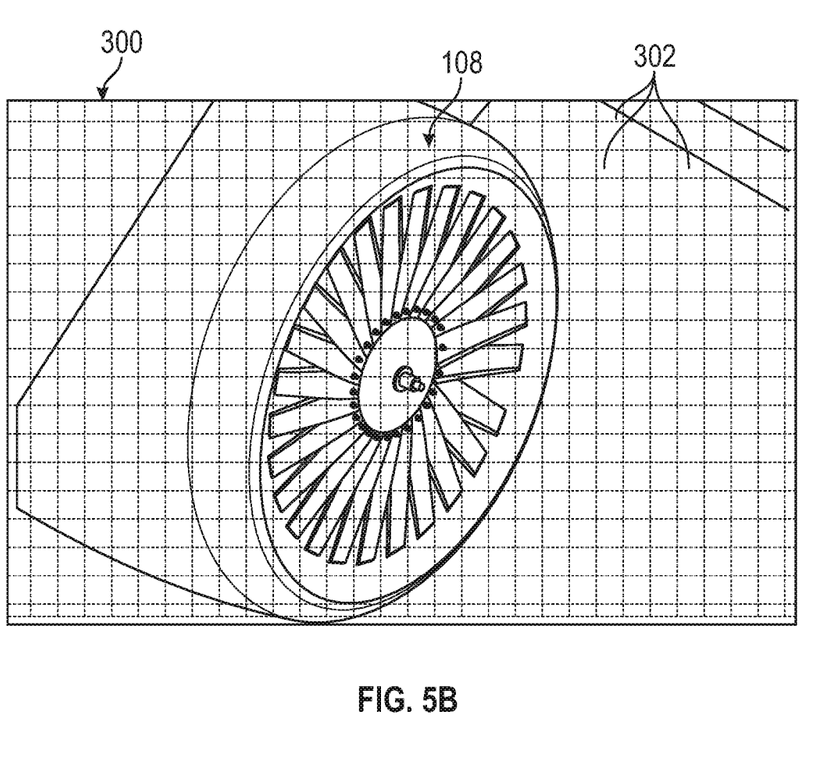
FIG. 5B depicts a field of view (FOV) of neuromorphic sensor shown in FIG. 5A according to another non-limiting embodiment of the present disclosure.

Turning to FIGS. 5A and 5B, a neuromorphic FOD detection system 100 is illustrated according to another non-limiting embodiment. In this example, the example, neuromorphic sensors 104 are coupled to an aircraft 150 and orientated to establish a FOV 110 that contains the aircraft engine 108. As shown in FIG. 5B, the neuromorphic sensors 104 capture the engine 108 in the FOV 110 while existing in a nominal environment, i.e., when no FOD is present near the engine 108.

Figure 6A:
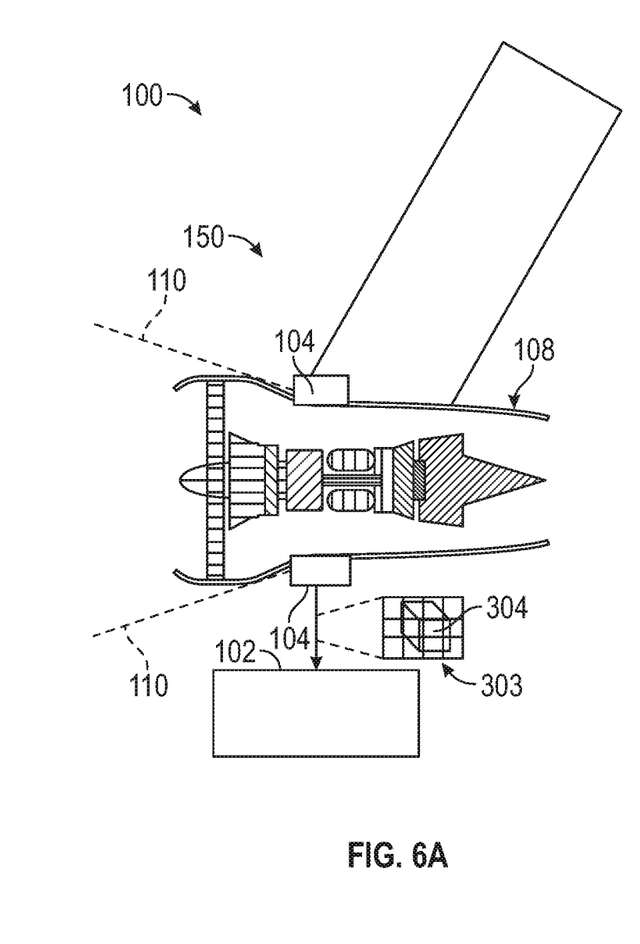
FIG. 6A depicts the neuromorphic sensor of FIG. 5A detecting FOD in the image according to another non-limiting embodiment of the present disclosure.
Figure 6B:
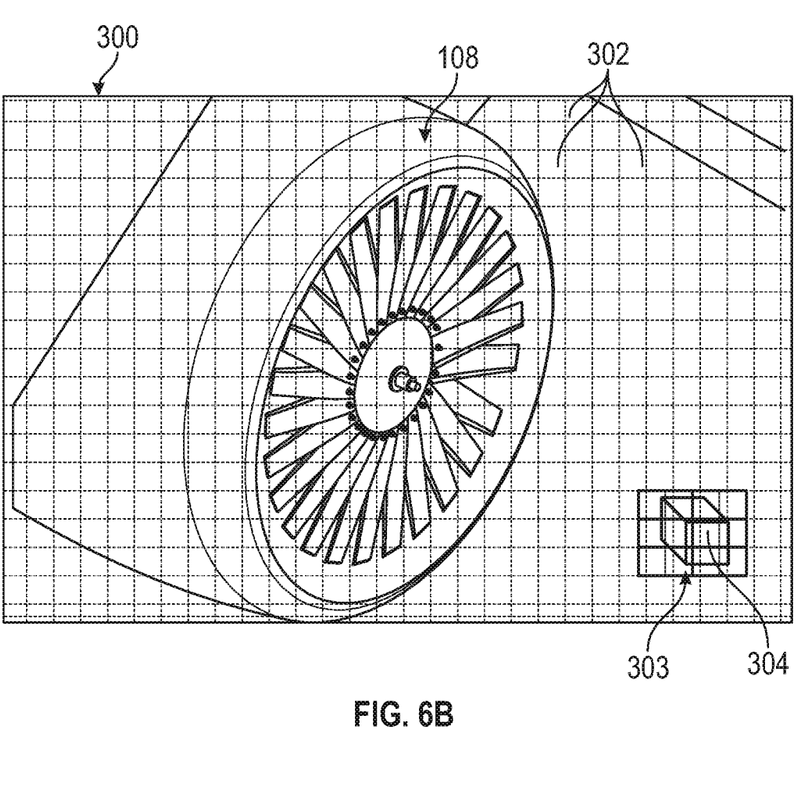
FIG. 6B depicts the FOV of FIG. 5B including FOD according to another non-limiting embodiment of the present disclosure.

In FIGS. 6A and 6B, FOD 304 appears in the FOV 110 (e.g., on the taxiway) and is present near the engine 108. As described herein, the introduction of the FOD 304 changes the brightness of one or more localized pixels 303 containing the FOD 304 (as indicated by highlighted pixels 303) without changing the brightness of pixels excluding the FOD 304. Accordingly, one or more of the neuromorphic sensors 104 output pixel data indicating the affected localized pixels 303 and the FOD 304 without outputting pixel data corresponding to the remaining pixels 302, i.e., the pixels 302 that exclude the FOD 304. Accordingly, the processing system 102 can detect FOD 304 is present in the surrounding environment of the engine 108 (e.g., on the taxiway) which is not normally present in the nominal environment of the engine 108. In response to detecting the FOD 304, the processing system 102 can automatically trigger other sensors such as one or more high-fidelity like or speed-cameras to begin collecting data. In this manner, the amount of data associated with high-fidelity and high-speed image capturing and processing can be reduced, e.g., captured, stored and processed only when the FOD processing system 102 system identifies a FOD 304. In addition, the FOD processing system 102 can also generate an alert (e.g., an audio alert, visual alert, haptic alert, etc.) that alerts a technician of the FOD 304. In this manner, the FOD 304 can be removed so that it is not ingested into the engine 108.

Figure 7:
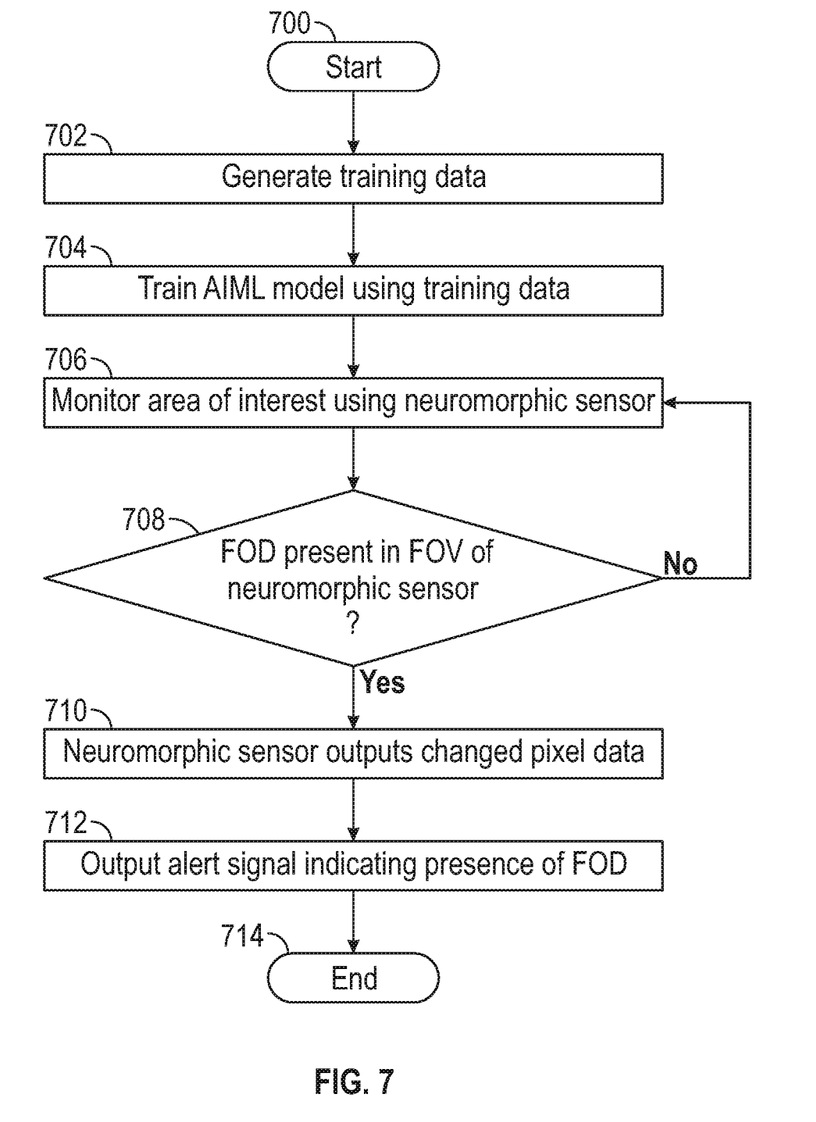
FIG. 7 is a flow diagram illustrating a method of performing neuromorphic FOD detection according to another non-limiting embodiment of the present disclosure.

Turning now to FIG. 7, a method of performing neuromorphic FOD detection is illustrated according to a non-limiting embodiment. The method begins at operation 700, and at operation 702 training data for training a neuromorphic FOD detection system is generated. At operation 704, an AIML model utilized by the neuromorphic FOD detection system is trained using the training data. At operation 706, a neuromorphic sensor is located near an area of interest in which to detect FOD. In one or more non-limiting embodiments, the area of interest is an aircraft engine.

At operation 708, the neuromorphic sensor detects whether FOD is present in the area of interest. When FOD is not present in the FOV of the neuromorphic sensor, the method returns to operation 706 and continues monitoring the area of interest. When, however, FOD is present in the FOV of the neuromorphic sensor, one or more pixels of the neuromorphic sensor are changed (e.g., the brightness level of the pixels change) and the neuromorphic sensor outputs changed pixel data at operation 710. At operation 712, the neuromorphic FOD detection system (e.g., a FOD controller) receives the changed pixel data from the neuromorphic sensor, and outputs an alert signal indicating the presence of FOD in the area of interest, e.g., near the aircraft engine. The method ends at operation 714.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. A neuromorphic foreign object debris (FOD) detection system comprising:
   a FOD processing system including a FOD controller including a trained artificial intelligence machine learning (AIML) model representing an area of interest; and
   a neuromorphic sensor in signal communication with the FOD processing system, the neuromorphic sensor having a field of view (FOV) containing the area of interest and configured to output pixel data in response to FOD appearing in the FOV,
   wherein the FOD controller detects the FOD is present in the area of interest in response to receiving the pixel data, and generates an alert signal indicating the presence of the FOD.

2. The FOD detection system of claim 1, wherein the AIML model is implemented as a deep convolutional neural network (DCNN) model.

3. The FOD detection system of claim 1, wherein the AIML model is implemented as a deep convolutional auto encoder (CAE) model.

4. The FOD detection system of claim 1, wherein the neuromorphic sensor includes an event camera including a plurality of pixels, each pixel configured to realize a local change in brightness and to output local pixel data indicating the local change in brightness as it occurs, and wherein the pixel data indicates corresponding to at least one localize pixel among the plurality of pixels that realizes the local change in brightness while excluding pixel data corresponding to remaining pixels that do not realize the local change in brightness.

5. The FOD detection system of claim 1, wherein the area of interest includes an aircraft engine.

6. The FOD detection system of claim 5, wherein the neuromorphic sensor is located remotely from the aircraft engine and the FOV contains the aircraft engine.

7. The FOD detection system of claim 5, wherein the neuromorphic sensor is coupled to an aircraft engine and the FOV contains the aircraft engine.

8. The FOD detection system of claim 5, wherein the neuromorphic sensor is disposed inside the aircraft engine.

9. A method of performing neuromorphic foreign object debris (FOD) detection comprises:
   generating training data;
   training an artificial intelligence machine learning (AIML) model using the training data depicting an area of interest;
   monitoring the area of interest using a neuromorphic sensor;
   outputting pixel data from the neuromorphic sensor in response to FOD appearing in the area of interest; and
   generating an alert indicating a presence of FOD in the area of interest in response based on the pixel data.

10. The method of claim 9, wherein the AIML model is implemented as a deep convolutional neural network (DCNN) model.

11. The method of claim 9, wherein the AIML model is implemented as a deep convolutional auto encoder (CAE) model.

12. The method of claim 9, wherein the area of interest includes an aircraft engine.

13. The method of claim 12, wherein the neuromorphic sensor is located remotely from the aircraft engine and the FOV contains the aircraft engine.

14. The method of claim 12, wherein the neuromorphic sensor is coupled to an aircraft engine and the FOV contains the aircraft engine.

15. The method of claim 12, wherein the neuromorphic sensor is disposed inside the aircraft engine.

16. The FOD detection system of claim 4, wherein the FOD controller detects the FOD is present in the area of interest in response to receiving the output local pixel data from at least one pixel among the plurality of pixels.

17. The method of claim 9, further comprising detecting, by at least one local pixel among a plurality of pixels included in the neuromorphic sensor, a local change in brightness independent from a change in brightness among remaining pixels included in the plurality of pixels;
   analyzing, by a FOC controller, the the pixel data which indicates the local change in brightness of the at least one local pixel corresponding to at least one local pixel among the plurality of pixels while excluding pixel data corresponding to the remaining pixels that do not realize the local change in brightness; and
   determining the presence of FOD in the area of interest based on the local change in brightness of the at least one local pixel indicated by the pixel data.

* * * * *